United States Patent [19]

Fujii et al.

[11] Patent Number: 5,219,903

[45] Date of Patent: * Jun. 15, 1993

[54] PIGMENT MASTER BATCH FOR FILLER-CONTAINING POLYPROPYLENE COMPOSITIONS

[75] Inventors: Takeshi Fujii; Tatsuyuki Mitsuno, both of Chiba; Shinichi Hori, Osaka; Katsuyasu Fukuda, Nara; Yukio Kurioka, Hyogo, all of Japan

[73] Assignees: Sumitomo Chemical Company, Ltd.; Sumika Color Company, Ltd., both of Osaka, Japan

[ * ] Notice: The portion of the term of this patent subsequent to Aug. 20, 2008 has been disclaimed.

[21] Appl. No.: 675,171

[22] Filed: Mar. 26, 1991

Related U.S. Application Data

[63] Continuation-in-part of Ser. No. 420,898, Oct. 13, 1989, abandoned.

[30] Foreign Application Priority Data

Oct. 15, 1988 [JP] Japan ................. 63-260300

[51] Int. Cl.$^5$ ................................. C08J 3/20
[52] U.S. Cl. ..................... 523/351; 524/394; 524/449; 524/451
[58] Field of Search ............ 524/394, 449, 451; 523/351

[56] References Cited

U.S. PATENT DOCUMENTS

| | | | |
|---|---|---|---|
| 3,767,444 | 10/1973 | Zeisberger | 106/308 R |
| 3,888,679 | 6/1975 | Komatsu et al. | 524/394 |
| 4,235,641 | 11/1980 | Engelmann et al. | 106/308 M |
| 4,309,323 | 1/1982 | Orioff et al. | 260/28.5 |
| 4,650,747 | 3/1987 | Uno et al. | 430/536 |
| 5,023,286 | 6/1991 | Abe et al. | 524/128 |
| 5,041,259 | 8/1991 | Fujii et al. | 264/349 |

FOREIGN PATENT DOCUMENTS

| | | | |
|---|---|---|---|
| 0042627 | 12/1981 | European Pat. Off. | |
| 57-170945 | 10/1982 | Japan | 524/394 |
| 1108298 | 9/1966 | United Kingdom | |

OTHER PUBLICATIONS

Database WIPL, Abstracts No. 88-177765 and JP 63-113057 (May 18, 1988).

Primary Examiner—Paul R. Michl
Assistant Examiner—John J. Guarriello
Attorney, Agent, or Firm—Cushman, Darby & Cushman

[57] ABSTRACT

A pigment master batch suitable for filler-containing polypropylene compositions is provided. This pigment master batch comprises 100 parts by weight of a propylene homopolymer having a melt flow rate of at least 10 g/10 min. and 30–200 parts by weight of a processed pigment prepared by using a metallic salt of a fatty acid, a polyethylene wax or a polypropylene wax as a dispersion medium for pigment. A filler-containing polypropylone composition in which the above pigment master batch is incorporated is superior in dispersibility and balance of properties and can easily be processed into molded articles which are superior in balance of properties such as heat resistance, impact resistance and rigidity.

8 Claims, No Drawings

PIGMENT MASTER BATCH FOR FILLER-CONTAINING POLYPROPYLENE COMPOSITIONS

This is a continuation-in-part of application Ser. No. 420,898 filed Oct. 13, 1989 now abandoned.

The present invention relates to a coloring agent used for filler-containing thermoplastic resin compositions, namely, a pigment master batch, and also relates to a filler-containing thermoplastic resin composition in which the pigment master batch is incorporated. This pigment master batch, which is superior in pigment dispersibility and does not damage properties of thermoplastic resin compositions such as regidity, heat resistance and impact resistance, is suitable for coloration of filler-containing polypropylene resin compositions.

As coloring agents for filler-containing thermoplastic resin compositions, there are generally used dry colors comprising pigment and metallic soaps such as zinc stearate and magnesium stearate as dispersion medium, master powders comprising pigment and wax or fatty acid as dispersion media and master batches comprising these dry colors or master powders and thermoplastic resins such as polyethylene and polypropylene.

Generally, in order to obtain colored filler-containing thermoplastic resin compositions, fillers, coloring agents and thermoplastic resins are simultaneously blended and melt kneaded by an extruder, Banbury mixer, kneader or the like.

However, in the case of dry colors or master powders, their pigment dispersant is adsorbed to fillers in a melt kneading step, and thus pigment dispersibility is insufficient even if a high-performance kneading machine such as a twin-screw extruder and a Banbury mixer are used. This insufficient dispersion of pigments causes reduction in color density, uneven coloration and deterioration of properties, and as a result commercial value of products is much lowered.

For improving these defects, coloration is carried out by use of a pigment master batch, but even in this case, conventional pigment master batches are not enough to obtain sufficient pigment dispersibility and cannot satisfy the recent very high demands for appearance and balance in properties of molded articles.

Objects of the present invention are to provide a pigment master batch especially suitable for filler-containing polypropylene resin compositions and to provide a filler-containing polypropylene resin composition which is excellent in pigment dispersibility and improved in balance of properties and can be used even in the industrial field of automobile parts and electric and electronic parts which require heat resistance and impact resistance at a high level.

That is, the present invention relates to a pigment master batch for filler-containing polypropylene compositions, which is obtained by:

preparing 30-200 parts by weight of a processed pigment, which processed pigment is obtained by mixing a pigment and a dispersion medium which is selected from the group consisting of a metallic salt of fatty acid, a polyethylene wax and a polypropylene wax; and thereafter mixing said processed pigment with 100 parts by weight of a propylene homopolymer having a melt flow rate of at least 10 grams per 10 minutes, and also relates to a filler-containing polypropylene composition in which the above pigment master batch is incorporated.

The polypropylene used in the pigment master batch of the present invention is a crystalline propylene homopolymer. So-called block polypropylene is inferior in pigment dispersibility and random polypropylene is inferior in regidity and hardness.

This propylene homopolymer preferably has a melt flow rate (hereinafter referred to as "MFR" and measured by the method specified in JIS-K7210 at 230° C. under a load of 2.16 kg) of at least 10 g/10 min., especially preferably 15-100 g/10 min. If MFR is less than 10 g/10 min., the polymer is inferior in pigment dispersibility.

Next, the pigments used in the present invention are those which have been conventionally used for coloration of synthetic resins such as polyolefine, and thus are not critical.

Typical examples of the pigments are polyazo pigments, phthalocyanine pigments, perylene-perinone pigments, carbon black, titanium oxide, ultramarine and red oxide. These pigments may be used alone or in combination of two or more.

Dispersion medium for the pigments include, for example, metallic salts such as calcium, magnesium, aluminum and zinc salts of higher fatty acids such as stearic acid and lauric acid; polyethylene wax prepared by heat decomposition of known polyethylene under suitable conditions to adjust its molecular weight to about 500-about 20,000 or by polymerizing ethylene into polyethylene of a molecular weight of about 500-about about 20,000 under suitable conditions; or polypropylene wax prepared by heat decomposition of known polypropylene or polymerization of propylene to have a molecular weight of about 1,000-about 20,000. These may be used alone or in combination of two or more.

Examples of fillers are talc, (heavy or light) calcium carbonate, mica, glass fiber, barium sulfate, calcium silicate, clay, silica, aluminum hydroxide, magnesium hydroxide, carbon fiber and potassium titanate fiber. These may be used alone or in combination of two or more. Preferred are talc, calcium carbonate, barium sulfate, mica and glass fiber from the point of their properties.

Polypropylene resins used for the filler-containing polypropylene compositions are suitably homopolymers of propylene and crystalline copolymer resins of propylene with an α-olefin other than propylene or ethylene.

The polypropylene resins comprise propylene of the majority of the constitutive units thereof, and specific examples are crystalline propylene ethylene block or random copolymers, crystalline propylene butene block or random copolymers, and crystalline propylene ethylene butene copolymers. Especially preferred are crystalline propylene ethylene block copolymers of 30% by weight or less in ethylene content. Furthermore, synthetic rubbers such as ethylene-propylene copolymer rubbers (e.g., EPM, EPDM), styrene butadiene copolymer rubbers (e.g., SBR, SBS block copolymer) and hydrogenated products thereof, isoprene rubber, and isoprene isobutylene rubber may also be used in combination with the above-mentioned polypropylene resin.

The filler-containing polypropylene resin compositions used in the present invention are those which comprises the above-mentioned polypropylene resin, the above-mentioned filler and, if necessary, the above-mentioned synthetic rubber and can be obtained by melt kneading them by an extruder, Banbury mixer, kneader or the like. Furthermore, the composition may contain an anti-oxidant, a lubricating agent, an antistatic agent, a light stabilizer, an ultraviolet absorber or the like as an additional component.

Production method of the pigment master batch of the present invention is, for example, 30–70 parts by weight of a dispersant is added to obtain 100 parts by weight of a neat pigment (raw pigment) plus the dispersant, followed by grinding and mixing at a high speed by a mixing means such as Henschel mixer or the like, then the resulting processed pigment is added in an amount of 30–200 parts by weight to 100 parts by weight of propylene homopolymer, and the resulting mixture is melt kneaded by an ordinary kneading machine such as a single-screw extruder, twin-screw extruder, Banbury mixer, kneader or roll under heating and is made into pellets which are then subjected to processing.

Methods for molding the filler-containing polypropylene resin composition in which the pigment master batch of the present invention is incorporated are not critical. The composition is suitable for extrusion molding, injection molding and the like, and the effect of the present invention can be exhibited in any molded articles.

The thus-obtained filler-containing polypropylene composition in which the pigment master batch is incorporated is superior in dispersibility of pigments and fillers and is improved in surface impact resistance and appearance (weld line and gloss).

The present invention will be explained in more detail by the following examples.

Methods for measurement of properties and conditions for production of composition were as follows.

(1) Dispersibility

A plate-like test piece of 3 mm thick was pressed under 120 atm., at 230° C. for 3 minutes into a thin film sheet and then particle diameters of pigments and fillers were observed by a polarizing optical microscope at 50×magnification, whereby dispersibility was evaluated.

Dispersibility was evaluated by the maximum particle diameter of the circle equivalents to the pigment particles observed in the field of the polarizing optical microscope according to the following grades:

| Grade | | |
|---|---|---|
| 5 | maximum particle diameter | less than 10μ |
| 4 | " | 10–30μ |
| 3 | " | 30–50μ |
| 2 | " | 50–100μ |
| 1 | " | greater than 100μ |

(2) Falling Weight Impact Test (FWI)

Measurment was conducted according to the method specified in JIS-K7211 using a plate-like test piece of 3 mm thick at 23° C.

The plate-like test piece used in the above (1) and (2) was prepared by drying a composition at 120° C. for 2 hours by a hot-air drier and then injection molding the composition by an injection molding machine IS-150E-V manufactured by Toshiba Machine Co., Ltd. at a molding temperature at 220° C. and a mold temperature of 50° C. for an injection time of 15 sec. and a cooling time of 30 sec.

(3) Conditions for Production of Composition

The composition was prepared under the following conditions unless otherwise notified.

Respective components of given amounts were weighed and homogeneously premixed by a Henschel mixer and then the mixture was extruded by continuous twin-screw extruder (TEX 44 SS 30BW-2V manufactured by Japan Steel Works, Ltd.) at an extrusion amount of 30 kg/hr, a resin temperature of 220° C. and a screw speed of 350 rpm under suction through vent. Screws employed were ones which were designed to have triple screw-flight type rotor portion and kneading disc portion at different positions in a kneading zone.

EXAMPLES 1–8 (TABLE 1-1, TABLE 1-2)

(i) Preparation of Pigment Master Batches

Carbon black (BLACK PEARL 800 manufactured by Cabot Corp.), titanium dioxide (TIPAQUE CR-60 manufactured by Ishihara Sangyo Kaisha, Ltd.) or phthalocyanine blue (PHTHALOCYANINE BLUE GH manufactured by Sumitomo Chemical Co., Ltd.) as a pigment, magnesium stearate (SM-1000 manufactured by Sakai Chemical Co.), polyethylene wax (AC WAX manufactured by Allied Chemical Corp.) or polypropylene wax (HOECHST WAX PP-230 manufactured by Hoechst Aktiengesellschaft) as a dispersion medium, and NOBLEN Z101A (MFR=20, manufactured by Sumitomo Chemical Co., Ltd.) or NOBLEN Y101 (MFR=12, manufactured by Sumitomo Chemical Co., Ltd.) as a propylene homopolymer, were used.

Pigment master batches (I) comprising pigments, dispersion medium and propylene homopolymers above mentioned in the ratios shown in Table 1-1, were obtained by first mixing and grinding a pigment and a dispersion medium at a high speed and then kneading the thus-obtained powder with a propylene homopolymer by a kneader.

ii) Preparation and Evaluation of Test Pieces

Pigment master batches obtained in (i) above were blended with NOBLEN AX574 (MFR=45, manufactured by Sumitomo Chemical Co., Ltd.) as propylene-ethylene block copolymer, NOBLEN Z101A (manufactured by Sumitomo Chemical Co., Ltd.) as propylene homopolymer, TAFMER P-0280 (manufactured by Mitsui Petrochemical Industries, Ltd.) as ethylene-propylene copolymer rubber and MICRONWHITE 5000S (manufactured by Hayashi Kasei Co.) as filler in the ratios shown in Table 1-2 to obtain compositions. Test pieces were obtained from the compositions and evaluated, in accordance with the above-described methods for measurement of properties and conditions for production of compositions.

The results are shown in Table 1-2.

All of them showed good dispersibility and good falling weight impact resistance.

COMPARATIVE EXAMPLES 1–15 (TABLE 2-1, TABLE 2-2)

(i) Pigment Master Powders used in Comparative Examples

The same pigments and the same dispersion media as used in Examples 1–8 were subjected to high speed mixing and grinding at the ratio as shown in Table 2-1 to obtain pigment master powders of Comparative Examples 4–7.

(ii) Pigment Master Batches (II) Used in Comparative Examples 1-3 and 8-10

Pigment master batches used in Comparative Examples 1-3 and 8-10 were obtained by kneading at the ratio as shown in Table 2-1, above-obtained pigment master batches, with NOBLEN D501 (MFR=0.5, manufactured by Sumitomo Chemical Co., Ltd.) or NOBLEN H501 (MFR=3.5, manufactured by Sumitomo Chemical Co., Ltd.) as propylene homopolymer, or with SUMITOMO NOBLEN AW564 (MFR=8, manufactured by Sumitomo Chemical Co., Ltd.), SUMITOMO NOBLEN AY564 (MFR=8, manufactured by Sumitomo Chemical Co., Ltd.) or SUMITOMO NOBLEN AZ564 (MFR=8, manufactured by Sumitomo Chemical Co., Ltd.) as propylene-ethylene block copolymer.

(iii) Pigment Master Batches (III) used in Comparative Examples 11-15

Pigment master batches (III) used in Comparative Examples 11-15 were obtained by blending and grinding a pigment, a dispersion medium and propylene homopolymer (NOBLEN Z101A, MFR=20, manufactured by Sumitomo Chemical Co., Ltd.) by a kneader simultaneously.

In the same manner as in Examples 1-8, compositions were prepared using the master powders, master batches (II) or (III) as mentioned in (i), (ii) or (iii) above and at the mixing ratio as shown in Table 2-2 and evaluation was conducted. The results of evaluation are shown in Table 2-2.

The test pieces were all inferior in dispersibility as compared with those of Examples 1-8, and falling weight impact resistance (FWI) thereof also did not reach practical level.

TABLE 1-1

| Name of component | Formulation of pigment master batch (I) | | | | | | *Mixing |
|---|---|---|---|---|---|---|---|
| | Coloring component | | Dispersion medium | | Resin | | |
| Composition No. | Kind of pigment | Part by weight | Kind of dispersant | Part by weight | Propylene homopolymer | Part by weight | method of pigment |
| Example 1 | Carbon black | 15 | Magnesium stearate | 15 | SUMITOMO NOBLEN Z101A | 70 | (A) |
| Example 2 | Carbon black | 25 | Polyethylene wax | 25 | SUMITOMO NOBLEN Z101A | 50 | (A) |
| Example 3 | Carbon black | 25 | Polypropylene wax | 25 | SUMITOMO NOBLEN Z101A | 50 | (A) |
| Example 4 | Phthalocyanine blue | 15 | Magnesium stearate | 15 | SUMITOMO NOBLEN Z101A | 70 | (A) |
| Example 5 | Phthalocyanine blue | 25 | Polyethylene wax | 25 | SUMITOMO NOBLEN Z101A | 50 | (A) |
| Example 6 | Titanium dioxide | 25 | Polyethylene wax | 25 | SUMITOMO NOBLEN Z101A | 50 | (A) |
| Example 7 | Titanium dioxide | 25 | Magnesium stearate | 25 | SUMITOMO NOBLEN Z101A | 50 | (A) |
| Example 8 | Carbon black | 25 | Polyethylene wax | 25 | SUMITOMO NOBLEN Y101 | 50 | (A) |

*Mixing method of pigment of master batch or master powder
(A): Pigment is mixed and ground with dispersant and then melt kneaded with homopolypropylene to obtain master batch.
(B): Pigment, dispersant and homopolypropylene are mixed simultaneously and melt kneaded to obtain master batch.
(C): Pigment is mixed and ground with dispersant to obtain master powder.

TABLE 1-2

| Name of Component Composition No. | Formulation of composition | | | | | | | | Amount of pigment master batch or master powder Part by weight | Evaluation | |
|---|---|---|---|---|---|---|---|---|---|---|---|
| | Propylene-ethylene block copolymer | | Propylene homopolymer | | Ethylene propylene co-polymer rubber | | Filler | | | Dispersibility | FWI |
| | Kind | Wt % | Kind | Wt % | Kind | Wt % | Kind | Wt % | | — | kg · cm |
| Example 1 | SUMITOMO NOBLEN AX 574 | 40 | SUMITOMO NOBLEN Z101A | 35 | TAFMER P-0280 | 5 | Talc | 20 | 3.6 | 5 | 250 |
| Example 2 | SUMITOMO NOBLEN AX 574 | 40 | SUMITOMO NOBLEN Z101A | 35 | TAFMER P-0280 | 5 | Talc | 20 | 3.6 | 5 | 270 |
| Example 3 | SUMITOMO NOBLEN AX 574 | 40 | SUMITOMO NOBLEN Z101A | 35 | TAFMER P-0280 | 5 | Talc | 20 | 3.6 | 5 | 250 |
| Example 4 | SUMITOMO NOBLEN AX 574 | 40 | SUMITOMO NOBLEN Z101A | 35 | TAFMER P-0280 | 5 | Talc | 20 | 3.6 | 5 | 240 |
| Example 5 | SUMITOMO NOBLEN AX 574 | 40 | SUMITOMO NOBLEN Z101A | 35 | TAFMER P-0280 | 5 | Talc | 20 | 3.6 | 5 | 250 |
| Example 6 | SUMITOMO NOBLEN AX 574 | 40 | SUMITOMO NOBLEN Z101A | 35 | TAFMER P-0280 | 5 | Talc | 20 | 3.6 | 5 | 270 |
| Example 7 | SUMITOMO NOBLEN | 40 | SUMITOMO NOBLEN | 35 | TAFMER P-0280 | 5 | Talc | 20 | 3.6 | 5 | 260 |

TABLE 1-2-continued

| Name of Component Composition No. | Propylene-ethylene block copolymer Kind | Wt % | Propylene homopolymer Kind | Wt % | Ethylene propylene co-polymer rubber Kind | Wt % | Filler Kind | Wt % | Amount of pigment master batch or master powder Part by weight | Evaluation Dispers-ibility — | FWI kg·cm |
|---|---|---|---|---|---|---|---|---|---|---|---|
| Example 8 | AX 574 SUMITOMO NOBLEN AX 574 | 40 | Z101A SUMITOMO NOBLEN Z101A | 35 | TAFMER P-0280 | 5 | Talc | 20 | 3.6 | 5 | 270 |

TABLE 2-1

| Name of component Composition No. | Formulation of pigment of master powder, master batch (II) or (III) | | | | | | *Mixing method of pigment |
|---|---|---|---|---|---|---|---|
| | Coloring component Kind of pigment | Part by weight | Dispersion medium Kind of dispersant | Part by weight | Resin Kind of resin | Part by weight | |
| Comparative Example 1 | Carbon black | 25 | Polyethylene wax | 25 | SUMITOMO NOBLEN D501 | 50 | (A) |
| Comparative Example 2 | Carbon black | 25 | Polyethylene wax | 25 | SUMITOMO NOBLEN H501 | 50 | (A) |
| Comparative Example 3 | Phthalocyanine blue | 25 | Polyethylene wax | 25 | SUMITOMO NOBLEN H501 | 50 | (A) |
| Comparative Example 4 | Carbon black | 50 | Magnesium stearate | 50 | — | — | (C) |
| Comparative Example 5 | Carbon black | 50 | Polyethylene wax | 50 | — | — | (C) |
| Comparative Example 6 | Carbon black | 50 | Polypropylene wax | 50 | — | — | (C) |
| Comparative Example 7 | Phthalocyanine blue | 50 | Polyethylene wax | 50 | — | — | (C) |
| Comparative Example 8 | Carbon black | 25 | Polyethylene wax | 25 | SUMITOMO NOBLEN AW564 | 50 | (A) |
| Comparative Example 9 | Carbon black | 25 | Polyethylene wax | 25 | SUMITOMO NOBLEN AY564 | 50 | (A) |
| Comparative Example 10 | Carbon black | 25 | Polyethylene wax | 25 | SUMITOMO NOBLEN AZ564 | 50 | (A) |
| Comparative Example 11 | Carbon black | 25 | Polyethylene wax | 25 | SUMITOMO NOBLEN Z101A | 50 | (B) |
| Comparative Example 12 | Phthalocyanine blue | 25 | Polyethylene wax | 25 | SUMITOMO NOBLEN Z101A | 50 | (B) |
| Comparative Example 13 | Titanium dioxide | 25 | Polyethylene wax | 25 | SUMITOMO NOBLEN Z101A | 50 | (B) |
| Comparative Example 14 | Titanium dioxide | 15 | Magnesium stearate | 15 | SUMITOMO NOBLEN Z101A | 70 | (B) |
| Comparative Example 15 | Carbon black | 15 | Magnesium stearate | 15 | SUMITOMO NOBLEN Z101A | 70 | (B) |

*Mixing method of pigment of master batch or master powder
(A): Pigment is mixed and ground with dispersant and then melt kneaded with homopolypropylene to obtain master batch.
(B): Pigment, dispersant and homopolypropylene are mixed simultaneously and melt kneaded to obtain master batch.
(C): Pigment is mixed and ground with dispersant to obtain master powder.

TABLE 2-2

| Name of Component Composition No. | Propylene-ethylene block copolymer Kind | Wt % | Propylene homopolymer Kind | Wt % | Ethylene propylene co-polymer rubber Kind | Wt % | Filler Kind | Wt % | Amount of pigment master batch or master powder Part by weight | Evaluation Dispers-ibility — | FWI kg·cm |
|---|---|---|---|---|---|---|---|---|---|---|---|
| Comparative Example 1 | SUMITOMO NOBLEN AX 574 | 40 | SUMITOMO NOBLEN Z101A | 35 | TAFMER P-0280 | 5 | Talc | 20 | 3.6 | 2 | 180 |
| Comparative Example 2 | SUMITOMO NOBLEN AX 574 | 40 | SUMITOMO NOBLEN Z101A | 35 | TAFMER P-0280 | 5 | Talc | 20 | 3.6 | 3 | 220 |
| Comparative Example 3 | SUMITOMO NOBLEN AX 574 | 40 | SUMITOMO NOBLEN Z101A | 35 | TAFMER P-0280 | 5 | Talc | 20 | 3.6 | 3 | 210 |
| Comparative Example 4 | SUMITOMO NOBLEN | 40 | SUMITOMO NOBLEN | 35 | TAFMER P-0280 | 5 | Talc | 20 | 1.1 | 1 | 110 |

TABLE 2-2-continued

| Name of Component Composition No. | Propylene-ethylene block copolymer Kind | Wt % | Propylene homopolymer Kind | Wt % | Ethylene propylene co-polymer rubber Kind | Wt % | Filler Kind | Wt % | Amount of pigment master batch or master powder Part by weight | Evaluation Dispersibility — | FWI kg · cm |
|---|---|---|---|---|---|---|---|---|---|---|---|
| Comparative Example 5 | SUMITOMO NOBLEN AX 574 | 40 | SUMITOMO NOBLEN Z101A | 35 | TAFMER P-0280 | 5 | Talc | 20 | 1.8 | 2 | 120 |
| Comparative Example 6 | SUMITOMO NOBLEN AX 574 | 40 | SUMITOMO NOBLEN Z101A | 35 | TAFMER P-0280 | 5 | Talc | 20 | 1.8 | 2 | 100 |
| Comparative Example 7 | SUMITOMO NOBLEN AX 574 | 40 | SUMITOMO NOBLEN Z101A | 35 | TAFMER P-0280 | 5 | Talc | 20 | 1.8 | 2 | 140 |
| Comparative Example 8 | SUMITOMO NOBLEN AX 574 | 40 | SUMITOMO NOBLEN Z101A | 35 | TAFMER P-0280 | 5 | Talc | 20 | 3.6 | 3 | 220 |
| Comparative Example 9 | SUMITOMO NOBLEN AX 574 | 40 | SUMITOMO NOBLEN Z101A | 35 | TAFMER P-0280 | 5 | Talc | 20 | 3.6 | 3 | 230 |
| Comparative Example 10 | SUMITOMO NOBLEN AX 574 | 40 | SUMITOMO NOBLEN Z101A | 35 | TAFMER P-0280 | 5 | Talc | 20 | 3.6 | 3 | 230 |
| Comparative Example 11 | SUMITOMO NOBLEN AX 574 | 40 | SUMITOMO NOBLEN Z101A | 35 | TAFMER P-0280 | 5 | Talc | 20 | 3.6 | 2 | 150 |
| Comparative Example 12 | SUMITOMO NOBLEN AX 574 | 40 | SUMITOMO NOBLEN Z101A | 35 | TAFMER P-0280 | 5 | Talc | 20 | 3.6 | 2 | 130 |
| Comparative Example 13 | SUMITOMO NOBLEN AX 574 | 40 | SUMITOMO NOBLEN Z101A | 35 | TAFMER P-0280 | 5 | Talc | 20 | 3.6 | 3 | 180 |
| Comparative Example 14 | SUMITOMO NOBLEN AX 574 | 40 | SUMITOMO NOBLEN Z101A | 35 | TAFMER P-0280 | 5 | Talc | 20 | 3.6 | 3 | 170 |
| Comparative Example 15 | SUMITOMO NOBLEN AX 574 | 40 | SUMITOMO NOBLEN Z101A | 35 | TAFMER P-0280 | 5 | Talc | 20 | 3.6 | 2 | 140 |

As explained above, the filler-containing polypropylene resin composition which contains the pigment master batch of the present invention is superior in dispersibility and exhibits conspicuous effect in balance of properties, especially in surface impact resistance even in the case of simultaneous color compounding of fillers, polypropylene resins and pigment master batches.

The resin composition provided by the present invention can be easily processed to shaped articles, sheets, etc. by molding methods such as injection molding and extrusion molding commonly used for molding of thermoplastic resins and the resulting articles having a good balance of properties such as heat resistance, impact resistance and rigidity and have excellent appearance such as smoothness.

We claim:

1. A pigment master batch for filler-containing polypropylene compositions, which is obtained by:
preparing 30-200 parts by weight of a processed pigment, which processed pigment is obtained by mixing a pigment and a dispersion medium which is selected from the group consisting of a metallic salt of fatty acid, a polyethylene wax and a polypropylene wax; and thereafter mixing said processed pigment with 100 parts by weight of a propylene homoploymer having a melt flow rate of at least 10 grams per 10 minutes.

2. A pigment master batch according to claim 1, wherein the propylene homopolymer has a melt flow rate of 15-100 g/10 min.

3. A pigment master batch according to claim 1, wherein the dispersion medium is calcium stearate or calcium laurate.

4. A pigment master batch according to claim 1, wherein the dispersion medium is a polyethylene wax having a number average molecular weight of 500-20,000.

5. A pigment master batch according to claim 1, wherein the dispersion medium is a polypropylene wax having a number average molecular weight of 1,000-20,000.

6. A filler-containing polypropylene composition which contains the pigment baster batch of claim 1.

7. A filler-containing polypropylene composition according to claim 6, wherein the filler is talc, mica or calcium carbonate.

8. A filler-containing polypropylene composition according to claim 6, which contains a synthetic rubber.

* * * * *